United States Patent Office 3,512,986
Patented May 19, 1970

3,512,986
RUMINANT FEED SUPPLEMENT
Frank M. Snyder, Omaha, Nebr., Harvey J. Stangel, Highland Park, N.J., and Thomas E. Freese, Indianapolis, Ind., assignors to Allied Chemical Corporation, New York, N.Y., a corporation of New York
No Drawing. Continuation of application Ser. No. 479,324, Aug. 12, 1965. This application June 20, 1969, Ser. No. 838,029
Int. Cl. A23k 1/22
U.S. Cl. 99—2                                                 6 Claims

ABSTRACT OF THE DISCLOSURE

An improved ruminant feed and process of making same wherein ammoniated superphosphoric acid derived from wet process phosphoric acid is utilized. The ammoniated superphosphoric acid provides the desired nutrients nitrogen and phosphorus together with solubilized trace minerals for the ruminant.

This application is a continuation of application Ser. No. 479,324, filed Aug. 12, 1965, now abandoned.

This invention relates to improved supplements for ruminant feeds, and more particularly to novel nitrogen and phosphorus-containing supplements for ruminant feeds.

Ruminants, including cattle, sheep, goats and camels are of great economic importance over much of the world for such purposes as sources of food, fiber, hides and power. In many places the natural forage available to such animals is deficient in various elements, such as nitrogen and phosphorus, which are important for the ruminant's growth and health. There has been a continuing interest in supplementing the diet of ruminants to overcome such deficiencies and to provide improved feeds for ruminants which are penned or otherwise confined to limited areas.

Providing a nitrogen and phosphorus-containing feed supplement for ruminants is complex. Such factors as cost and utilization must be considered, for although a wide variety of materials containing these elements are known, many materials are economically unfeasible as supplements in the amounts required. Some, while relatively inexpensive on a weight basis are not properly utilized by the ruminants and therefore are uneconomical because of the relatively large quantities which must be used.

It is preferable for the supplement to be in a liquid form, such as an aqueous solution, so that it has the inherent advantageous properties of a liquid including ease of measuring, transferring and mixing.

In addition, it is preferable for a liquid supplement to be stable during storage, e.g., that it not precipitate out of solution, and that it be compatible with other liquid supplements, e.g., that the supplement may be mixed with other liquid supplements without causing them to precipitate out of solution.

It is also preferable at times for the supplement to be low in calcium content, for in many areas where the calcium content of the soil is high, such as in western parts of the United States, calcium-rich supplements, such as calcium phosphate, are not used for fear of inducing the formation of urinary calculi in ruminants.

Consideration of the diet of ruminants includes a consideration of the symbiotic microflora which are normally present in the digestive tract of such animals since such microflora are an essential factor in the animals' nutrition, as disclosed in U.S. Pat. 2,808,332. It is preferable for the supplement to assist the ruminant's symbiotic assimilation of microflora so as to increase the ruminant's appetite for inexpensive roughage which may conveniently be provided as corn cobs, straw, stover, hay or other such agricultural by-products.

Another factor in selecting materials as supplements is palatability. Ruminants exhibit preferences and selection in the materials offered to them for ingestion. The supplement should be palatable so that the ruminant will of its own accord ingest the proper quantity of the supplement. However, the supplement should not be so palatable that the ruminant will overindulge in the supplement.

It has been suggested in the past that ammonium phosphate be used as a nitrogen and phosphorus-containing feed supplement. However, the forms of ammonium phosphate heretofore proposed or used as such feed supplements have not been entirely satisfactory.

Solid ammonium phosphates have the disadvantages of relatively high cost and must be dissolved in water if the inherent advantages of a supplement in liquid form are to be obtained, thus increasing cost. Furthermore, diammonium phosphate is not only a solid, but releases ammonia on contact with water, e.g., during pellet-forming operations, and saliva causing unpalatability.

A desirable form of ammonium phosphate would, therefore, be one which is produced in an aqueous solution, for example, by ammoniation of aqueous phosphoric acid. Phosphoric acid obtained by the wet process is relatively inexpensive but contains water-soluble, contaminants including trace minerals which precipitate when the acid is ammoniated. These contaminants as well as $P_2O_5$ slowly settle out of solution for a considerable period after preparation, rendering such a product difficult to handle and unsuitable for storage. Some of the trace minerals which are present in wet-process phosphoric acid, such as iron, and magnesium have nutritional value. It would be desirable to retain such trace minerals in solution along with the nitrogen and phosphorus-containing material to provide a feed supplement of enhanced nutritional value.

An object of this invention is to provide a nitrogen and phosphorus-containing ruminant feed supplement which is relatively low in cost.

Another object of the present invention is to provide a nitrogen and phosphorus-containing ruminant feed supplement at about neutral pH in liquid form which is highly compatible with other feed supplements and is highly stable during storage.

A further objective of the present invention is to provide a feed supplement which is palatable to ruminants, assists the symbiotic microflora normally present in the digestive tract of ruminants and increases the ruminants consumption of roughage and feed efficiency.

Still other objects will be apparent from the subsequent description.

It has now been found that these and other objects are obtained by use of aqueous ammoniated wet-process superphosphoric acid which material can be obtained by evaporating aqueous wet-process phosphoric acid so as to form aqueous wet-process superphosphoric acid which is then ammoniated.

The aqueous ammoniated superphosphoric acid of this invention has a pH of from about 5 to 8, preferably about 6; a nitrogen content of from about 9% to 12% by weight, preferably from about 10% to 11% by weight; a total phosphorus content measured as $P_2O_5$ of from about 28% to 39% by weight, preferably about 34% to 38% by weight, and wherein polymeric phosphates represent from about 30% to 70% by weight, preferably from about 55% to 65% by weight, based on the weight of the total phosphorus content. The polymeric phosphates include pyrophosphates and polyphosphates.

An aqueous ammoniated superphosphoric acid having the following properties which will hereinafter be referred to as "Solution A," was found to be useful for purposes of the present invention:

Nitrogen—10% by weight
Phosphorus [1] (as $P_2O_5$)—34% by weight
Trace minerals—1 to 2% by weight
   Iron ($Fe_2O_3$)—ca. 1.0% by weight
   Calcium (CaO)—ca. 0.1% by weight
   Magnesium (MgO)—ca. 0.3% by weight
pH—6.0
Specific gravity at 60° F.—1.4
Salting out temperature—0° F.

[1] Distribution as percent by weight of the ammonium phosphates present was about: 37% ammonium orthophosphate, 49% ammonium pyrophosphate, 8% ammonium tripolyphosphate, 5% ammonium tetrapolyphosphate, 1% higher ammonium phosphates.

Solution A remained stable for at least 30 days at ambient temperatures. It could be satisfactorily stored in or handled in contact with mild steel, stainless steel and plastic. Small amounts of water-soluble nutritive trace minerals such as iron, copper, and zinc, could be added to Solution A and retained in solution. Solution A was not corrosive to the human skin and, on accidental contact, could be washed off with water.

In order to illustrate the effectiveness of aqueous ammoniated superphosphoric acid as a feed supplement for ruminant animals a feeding experiment was carried out on growing steers using Solution A. The experiment illustrates that aqueous ammoniated superphosphoric acid is comparable in availability and utilizability of phosphorus to a standard ruminant feed supplement. The experiment is described below. All weights are in pounds, unless specified otherwise.

A growth study was conducted with a phosphorus deficient ration fed unsupplemented and supplemented with the test phosphorus solution and with a standard phosphorus source, i.e., dicalcium phosphate. The ration, although deficient in phosphorus had sufficient energy and nitrogen to support growth of approximately 1 pound per day or better.

Forty-two weanling calves weighing approximately 500 pounds each were placed on a phosphorus deficient wintering-type ration described as the basal ration in Table 2 for approximately 2 weeks. The composition of the feed ingredients is shown in Table 1. At the end of that preliminary depletion phase blood samples were taken and found to be between 3 and 4 milligram per 100 cc. in phosphorus. The steers were then allotted into 6 lots of 7 animals each and placed on the rations as shown in Table 2. The animals were allowed to eat ad libitum and animal weights were measured at 2-week intervals. Blood samples were again taken at approximately the middle of the experiment and at the end of the 84-day feeding period for blood phosphorus analysis and for determination of alkaline phosphatase. Weight gains, feed efficiency, serum phosphorus, repletion and alkaline phosphatase levels were used as criteria for sufficiency of phosphorus in the ration. Serum phosphorus was determined by the Fisk-Subbarow (J. Biol. Chem. 66:375, 1925) method while alkaline phosphatase was determined by the Bessey (Bessey et al., J. Biol. Chem., 1946) procedure as described by the Sigma Chemical Company and their bulletin No. 104.

Table 2 presents the summary of performance of the steers in the feeding trial as well as the serum phosphorus and alkaline phosphatase data. Numerous previous workers have noted that one of the first symptoms of a phosphorus deficiency is a decrease in appetite and this effect was markedly apparent in this experiment. The animals receiving supplementary phosphorous from either dicalcium phosphate or Solution A ate almost twice as much feed on the average as the animals on the basal ration. This was then reflected in the animals' rate of gain. The animals on dicalcium phosphate and Solution A performed about equally, no problems of palatability were encountered.

The responses in serum phosphorus levels in the animals placed on supplementary phosphorus are notable. Both in the middle term blood sample and in the final blood sample those animals on supplementary phosphorus returned to what is considered a normal level for blood phosphorus whereas those on basal ration remained approximately the same as after depletion. Again no difference between the two types of phosphorus supplements was noted. Researchers have shown that the alkaline phosphatase enzyme in blood plasma increases when a phosphorus deficiency is present. In this study an increase in alkaline phosphatase in the animals on the basal rations is shown.

In summary of the experiment it is clear that the basal ration was truly deficient in phosphorus. The rations were designed so that the supplements with dicalcium phosphate or Solution A would supply enough phosphorus to fully meet the National Research Council requirements. It is shown that they were both utilized and about equally well.

TABLE 1.—COMPOSITION OF FEEDSTUFFS USED

| | Chemical Analysis D.M.[1] basis | | | |
|---|---|---|---|---|
| | Crude protein, percent | Ash, percent | Phosphorus, mg./gm. | D.M.,[1] percent |
| Molasses dried beet pulp | 11.06 | 4.93 | 0.673 | 92.5 |
| Corn stover silage | 11.43 | 7.80 | 1.104 | 31.6 |
| Supplements:[2] | | | | |
|   P-1, Control (Basal) | 19.84 | 7.34 | 2.54 | 88.1 |
|   P-2, Dicalcium phosphate | 19.89 | 11.34 | 23.89 | 88.6 |
|   P-3, Solution A | 22.19 | 15.78 | 26.52 | 78.4 |

[1] Digestible material.
[2] Supplements comprise ground corn with phosphate source added in P-2 and P-3 supplements.

TABLE 2.—PERFORMANCE OF STEERS

| | Lot and treatment | | | | | |
|---|---|---|---|---|---|---|
| | 1 | 2 | 3 | 4 | 5 | 6 |
| Item | Basal | Basal | Dical.[1] | Dical. | Sol. A | Sol. A |
| Number of steers | 7 | 7 | 7 | 7 | 7 | 7 |
| Avg. weight at 0 days | 494 | 501 | 501 | 496 | 506 | 495 |
| Avg. weight after 84 days | 512 | 523 | 607 | 624 | 622 | 606 |
| Avg. daily gain (over 84 days) | 0.20 | 0.27 | 1.27 | 1.53 | 1.38 | 1.32 |
| Avg. daily feed consumed: | | | | | | |
|   Corn stover silage | 3.44 | 3.73 | 11.56 | 12.35 | 11.98 | 11.66 |
|   Molasses dried beet pulp | 5.45 | 5.64 | 6.00 | 6.00 | 6.00 | 6.00 |
|   Supplement (see Table 1) | 0.96 | 0.96 | 0.96 | 0.96 | 0.96 | 0.96 |
|   Trace mineralized salt | 0.06 | 0.05 | 0.05 | 0.05 | 0.06 | 0.06 |
|   Total | 9.91 | 10.38 | 18.57 | 19.36 | 19.00 | 18.68 |
| Feed per 100 lb. gain | 49.6 | 38.4 | 14.6 | 12.7 | 13.8 | 14.2 |
| Serum phosphorus (in mg./100 cc.): | | | | | | |
|   Start of test | 3.55 | 4.33 | 3.71 | 3.94 | 3.81 | 3.23 |
|   After 34 days | 3.06 | 3.39 | 8.28 | 8.40 | 8.32 | 8.32 |
|   After 80 days | 2.94 | 3.89 | 7.57 | 7.54 | 7.27 | 7.44 |
| Alkaline Phosphatase (in sigma units/ml.): | | | | | | |
|   After 34 days | 7.66 | 6.09 | 3.62 | 5.55 | 4.87 | 5.13 |
|   After 77 days | 7.88 | 6.19 | 4.43 | 5.07 | 4.91 | 4.22 |

[1] Dicalcium phosphate.
[2] Solution A.

Another comparative feed trial was carried out with heifers. One hundred sixty-eight heifers weighing approximately 800 pounds each were divided into two equal groups. The 84 heifers in one group were fed a ration supplemented with Solution A as shown in Table 3; the heifers in the other group were fed a ration supplemented with dicalcium phosphate as shown in Table 4. The feed test lasted 56 days. Results of the two feed rations are shown below in the respective tables.

TABLE 3

Average daily feed (pounds for 84 heifers fed ration containing Solution A)

| | |
|---|---|
| Ground alfalfa | 153 |
| Ground ear corn | 480 |
| Ground shelled corn | 474 |
| Milo (barley) | 450 |
| Dehydrated alfalfa pellets | 50 |
| Flax meal | 109 |
| Hi-pro pellets | 98 |
| Wet pulp | 355 |
| Silage | 282 |
| Dicalcium phosphate (first 14 days) | 10 |
| Calcium carbonate (last 42 days) | 4 |
| Green chap | 1367 |
| Salt | 13.4 |

Solution A—3 qts. (last 42 days).

The heifers gained an average of 3.34 pounds per day over the 56-day test. Calculated cost per pound of gain was 17.5 cents.

TABLE 4

Average daily feed (pounds for 84 heifers fed ration containing dicalcium phosphate)

| | |
|---|---|
| Ground alfalfa | 149 |
| Ground ear corn | 477 |
| Ground shelled corn | 476 |
| Milo (barley) | 455 |
| Dehydrated alfalfa pellets | 51 |
| Flax meal | 109 |
| Hi-pro pellets | 99 |
| Wet pulp | 340 |
| Silage | 280 |
| Dicalcium phosphate (first 32 days) | 5 |
| Green chap | 1405 |
| Salt | 15 |

The heifers gain an average of 3.50 pounds per day over the 56 day test. Calculated cost per pound of gain was 18.14 cents.

Aqueous ammoniated superphosphoric acid can be incorporated in a ruminant feed by mixing it with other substances such as urea, molasses, roughage, ground shelled corn, minerals, vitamins and trace elements, to obtain a mixture which is nutriously advantageous to the ruminant and its symbiotic microflore. Aqueous ammoniated superphosphoric acid may also advantageously be mixed with edible byproducts such as the residues obtained in processing sugar beets, soybeans, cottonseed and the like.

Aqueous ammoniated superphosphoric acid may advantageously be used in ruminant feeds in proportions of from about 0.2% to 6% by weight, based on the total weight of the composition, depending on the amount of available phosphorus in the feed and the needs of the ruminant.

Aqueous ammoniated superphosphoric acid may be conveniently incorporated into ruminant feeds for use in meal or in compressed shaped form, such as blocks, briquettes, pellets and the like. Pelleting operations were performed using a standard extrusion pelleting machine, and comparative tests were made using Solution A as a partial substitute for urea and full substitute for dicalcium phosphate in a regular pelleted cattle feed formulation. In one set of tests urea was added to the formulation in dry form separate from the Solution A; in the other formulation, part of the urea was mixed with the Solution A and water was added to form a solution. The comparative formulations used are given in Tables 5 and 6, together with comments below each table on pelleting results.

TABLE 5.—40% PROTEIN PELLETING FORMULATIONS

| Regular formulation weight, pounds | Experimental formulation weight, pounds | Material |
|---|---|---|
| 1,100 | 1,100 | Cottonseed meal. |
| 200 | 200 | Flax seed meal. |
| 415 | 415 | Milo. |
| 93 | 87 | Urea. |
| 150 | 150 | Molasses. |
| 10 | | Dicalcium phosphate. |
| 25 | 25 | Salt. |
| 3.5 | 10 | Stilbestrol. |
| | 3.5 | Aureomycin. |
| 25 | | Kellphos (colloidal calcium phosphate). |
| 4.5 | 4.5 | Vitamins A and D. |
| 3 | 3 | Trace minerals. |
| | 26 | Solution A. |
| | 2 | $H_2O$. |
| 0.25 | 0.25 | Ethylenediamine dihydroiodide. |

In summary of this pelleting experiment, power requirement was normal for the experimental formulation as compared with the regular formulation; a hard pellet was produced in both cases; some sticking was experienced until pellets cooled.

TABLE 6.—32% PROTEIN PELLETING FORMULATIONS

| Regular formulation | Experimental formulation | Material |
|---|---|---|
| 300 | 300 | Cottonseed meal. |
| 300 | 300 | Soybean meal. |
| 400 | 400 | Flax seed meal. |
| 220 | 220 | Dry alfalfa. |
| 100 | 100 | Corn. |
| 400 | 385 | Milo. |
| 80 | 50 | Urea. |
| 150 | 150 | Molasses. |
| 10 | | Dicalcium phosphate. |
| 25 | 25 | Salt. |
| 25 | | Kellphos (colloidal calcium phosphate) |
| 4.5 | 4.5 | Vitamins A and D. |
| 3 | 3 | Trace minerals. |
| | 80 | Mix containing 35.8 solution A, 16 urea and 28.2 water. |

As compared with the regular formulation, the experimental formulation showed the following advantages:
 (a) Power requirements reduced.
 (b) Increased production rate (ca. 12%–15%).
 (c) Good pellet quality.
 (d) Good short term storage characteristics.

We claim:
1. A feed for ruminants comprising:
 (a) solid edible carbohydrate material, and
 (b) aqueous ammoniated superphosphoric acid derived by evaporation of wet-process phosphoric acid and containing solubilized trace minerals therein, said aqueous ammoniated superphosphoric acid having a nitrogen content of about 9–12% and being ammoniated to about pH 6, whereby there is provided a feed so platable to the ruminant that the ruminant by its own free choice will consume it.

2. A process for improving the nutrition of a ruminant by feeding to said ruminant a nutritive amount of an aqueous ammoniated superphosphoric acid derived by evaporation of wet-process phosphoric acid and containing solubilized trace minerals therein, said aqueous ammoniated superphosphoric acid having a nitrogen content of about 9–12% and being ammoniated to about pH 6 to increase palatability to the ruminant.

3. A feed for ruminants according to claim 1 wherein the ammoniated superphosphoric acid is about 0.2% to 6% by weight, based on the total weight of said feed, said ammoniated superphosphoric acid having a total phosphorous content measured as $P_2O_5$ of from about 28% to 39% by weight, and wherein polymeric phosphates represent from about 30% to 70% by weight, based on the weight of the phosphorous content.

4. A feed for ruminants according to claim 3 wherein the aqueous ammoniated superphosphoric acid has a nitrogen content of from about 10% to 11% by weight, a total phosphorous content measured as $P_2O_5$ of from about 34% to 38% by weight, and wherein polymeric phosphates represent from about 55% to 65% by weight, based on the weight of the total phosphorous content.

5. A process for improving the nutrition of a ruminant according to claim 2 wherein the ammoniated superphosphoric acid is about 0.2% to 6% by weight, based on the total weight of said feed, said ammoniated superphosphoric acid having a total phosphorous content measured as $P_2O_5$ of from about 28% to 39% by weight, and wherein polymeric phosphates represent from about 30% to 70% by weight, based on the weight of the phosphorous content.

6. A process for improving the nutrition of a ruminant according to claim 5 wherein the aqueous ammoniated superphosphoric acid has a nitrogen content of from about 10% to 11% by weight, a total phosphorous content measured as $P_2O_5$ from about 34% to 38% by weight, and wherein polymeric phosphates represent from about 55% to 65% by weight, based on the weight of the total phosphorous content.

References Cited

UNITED STATES PATENTS 3,325,289  6/1967  Lyons _____ 99—6

OTHER REFERENCES

Sauchelli: Agr. Chemicals, vol. 18, pp. 54–56, June 1963.

Harwood: Agr. Chemicals, vol. 14, No. 5, pp. 42–3, 103; 1959.

LIONEL M. SHAPIRO, Primary Examiner